Jan. 22, 1952 E. J. H. BUSSARD 2,583,137
OSCILLATOR
Original Filed April 7, 1950
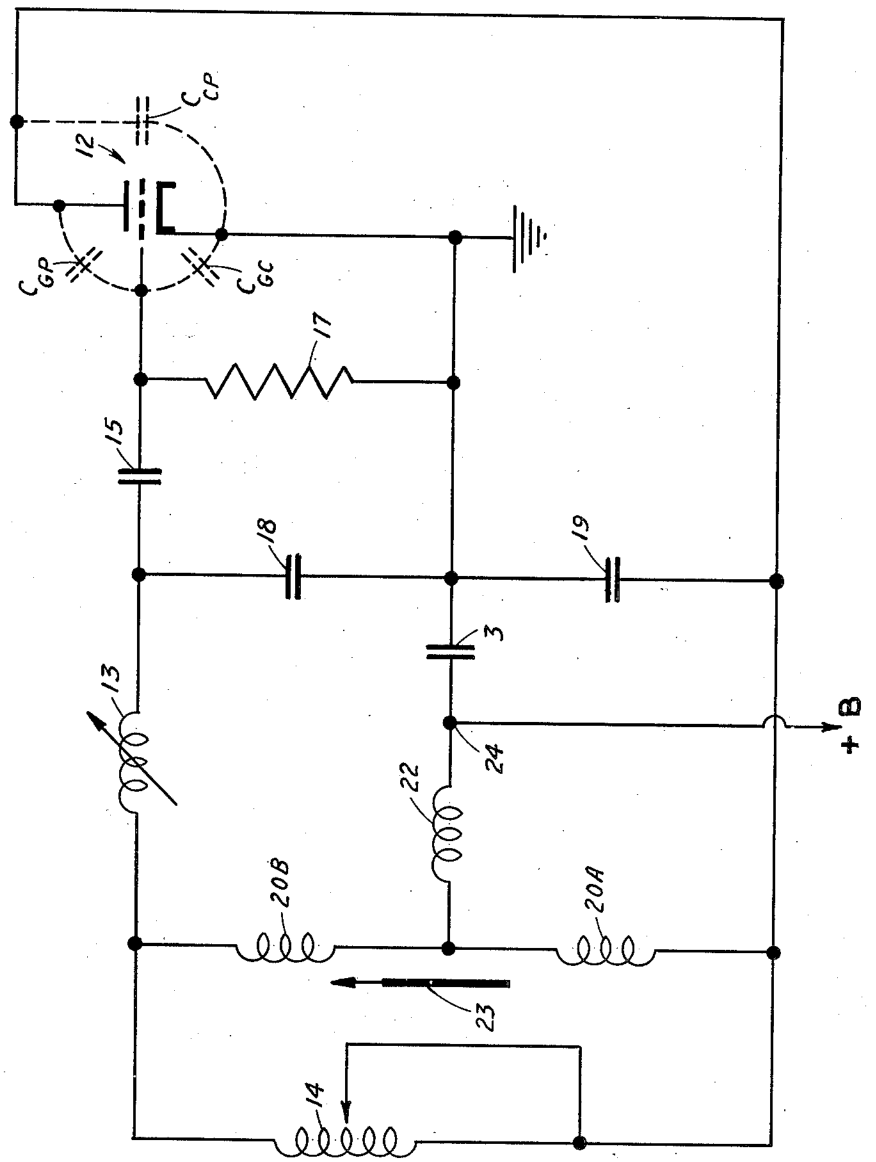
INVENTOR.
EMMERY J. H. BUSSARD.
BY Alden D. Redfield
Charles M. Hogan.
ATTORNEYS.

Patented Jan. 22, 1952 2,583,137

UNITED STATES PATENT OFFICE 2,583,137

OSCILLATOR

Emmery J. H. Bussard, Cincinnati, Ohio, assignor to Avco Manufacturing Corporation, Cincinnati, Ohio, a corporation of Delaware Original application April 7, 1950, Serial No. 154,535. Divided and this application January 27, 1951, Serial No. 208,165

3 Claims. (Cl. 250—36)

The present invention relates to oscillators, and particularly to oscillators of the type suitable for use in superheterodyne television receivers.

The primary object of the invention is to provide in a television selector or tuner, a novel oscillator circuit which is tunable throughout a wide range (for example, that extending from approximately 80 to 240 megacycles) and which at the same time satisfies the following requirements:

(1) Substantial uniformity of intensity of the local oscillations;

(2) Stable operation throughout that range.

For a better understanding of the present invention, together with other and further objects, advantages, and capabilities thereof, reference is made to the accompanying drawing, in the single figure of which there is shown in schematic diagram form the electrical circuit of a preferred form of oscillator provided by the invention.

It will be seen that this novel oscillator has a grid tank circuit comprising inductor 20B, adjustable inductor 13, capacitor 18, and inductor 22. This oscillator also has a plate tank circuit comprising inductor 20A, capacitor 19, and inductor 22, the last-mentioned inductor being in the cathode circuit and common to both tank circuits, so that the portion of the voltage fed back from the plate circuit to the grid circuit is applied to the grid circuit through this common inductance 22. The anode supply circuit for tube 12 may be traced from the plate of tube 12 through inductors 20A and 22 to the B terminal 24 at the junction of elements 3 and 22. In the well-known conventional tuned grid, tuned plate type of oscillator, such as that shown at page 392, Fig. 10-55, Reich, "Theory and Applications of Electron Tubes," second edition, McGraw-Hill Book Company, Inc., New York, the grid-plate capacitance $C_{GP}$ provides the feedback path. My novel oscillator differs from this type of circuit in the respect, among others, that the feedback voltage is applied to the grid circuit by the common inductor 22.

It should be noted that the capacitors 19 and 18 function as a voltage divider network between input and output circuits, the voltages for their respective terminals remote from one another being approximately 180 degrees out of phase, so that feedback will result.

The cathode of tube 12 is grounded, and between ground and the anode of the tube there are arranged in series capacitor 3, inductor 22, and inductor 20A, the latter being connected to the anode. Disposed between the grounded cathode and the grid is a series circuit comprising the capacitor 3, inductor 22, inductor 20B, adjustable inductor 13, and a coupling capacitor 15. Connected between the control electrode and ground is a grid resistor 17. A variable inductor 14 is connected in parallel with the series arrangement of inductors 20A and 20B, and inductors 20A and 20B are preferably portions of a single continuously wound inductor adjusted by an iron core 23. Effectively connected between grid and cathode, for radio frequency signals, is a capacitor 18 which is mechanically connected between the cathode and the junction of the elements 13, 15. Connected between the anode and cathode is a capacitor 19. The capacitors 18 and 19 function as a voltage divider network between the input and output circuits, the voltages for their respective terminals remote from one another being approximately 180 degrees out of phase, so that feedback results.

A serious limitation is placed on the operation of the usual conventional tuned grid, tuned plate type of oscillator. In that type, for proper design the inductive reactance of the tank circuit must be less than the capacitive reactance of the grid plate interelectrode capacity at the operating frequency. Since the inductive reactance of a given lumped inductance increases with frequency while the capacitive reactance between a given grid and plate decreases with frequency, the greater the operating frequency, the more difficult is the attainment of this design objective. Because that conventional type of circuit depends entirely on the $C_{GP}$ parameter for feedback, the intensity of the local oscillations produced tends to decrease with increases in operating frequency. The oscillator in accordance with the present invention does not suffer from this difficulty because the common inductor 22 assures high impedance coupling even at the highest operating frequencies, such as 240 megacycles, and the signal strength of the local oscillations is preserved during reception on the upper frequency channels. In this oscillator circuit the magnetic feedback coupling between the plate and grid circuits increases as the operating frequency is increased.

The oscillator in accordance with the invention possesses a high degree of stability throughout its range of operation, because both tank circuits are tuned in unison. Tuning is effected by adjustment of variable inductor 14, the latter being connected between the junction of inductor 20A and capacitor 19 and the junction of inductors 20B and 13. Inductor 13 is magnetically isolated from inductor 20B, and there is essentially no mutual coupling therebetween.

In the particular embodiment shown, it will be seen that the lumped capacitance 18 is in shunt with the inherent cathode-grid interelectrode capacitance ($C_{GC}$), and it will be obvious to those skilled in the art that the interelectrode capacitance alone can be employed in lieu of the interelectrode capacitance plus the lumped capacitance 18. Similarly, in the particular embodiment shown, there is illustrated a lumped capacitance 19 in shunt with the cathode-plate interelectrode capacitance ($C_{CP}$). It will be understood that the last-mentioned interelectrode capacitance alone may be utilized in lieu of said interelectrode capacitance plus the lumped capacitance 19. This circuit has considerable advantage over the Colpitts and tuned pate-tuned grid types of oscillator. In the Colpitts type of oscillator the cathode-to-grid and the cathode-to-plate lumped capacitances must be varied in unison in order to maintain the oscillations through a range of frequencies. The common disadvantage of the tuned grid-tuned plate oscillator is that it may oscillate at two frequencies so that the signal frequency may jump from one value to another. The Colpitts type of oscillator must be shunt fed and the Hartley is generally shunt or parallel fed.

The common characteristic of such conventional oscillators is that the local oscillations tend to fall off in intensity with an increase in frequency. Some television receiver tuners require substantially constant oscillator injection into the mixer throughout the range of operation, and my oscillator circuit satisfies this requirement.

The operating frequency of the oscillator is the frequency to which the LC circuit comprising capacitors 19 and 18 (and the effective capacitance in shunt therewith) and inductors 14 and 13 (and the inductance effectively in shunt therewith) is tuned. If it be assumed that this frequency is, say, 200 megacycles, then each of the grid and tank circuits, considered alone, is so tuned below the operating frequency as to appear capacitive at that frequency. In fact, each of these tank circuits, considered alone, appears to be capacitive at each operating frequency.

Another advantage of the oscillator in accordance with this invention is that it meets the requirements of uniformity and stability and at the same time operates satisfactorily on a low voltage supply.

As will be apparent from an inspection of the drawing, the grid-anode capacitance parameter denominated $C_{GP}$ furnishes additional coupling between the grid and plate tank circuits. However, the principal coupling is that afforded by the common magnetic element or inductor in the cathode circuit. As indicated in the drawing, the oscillator is adjusted as to frequency by manual variation of inductor 14.

The invention thus provides an oscillator comprising an electron tube 12 having at least cathode, grid, and plate electrodes, a grid tank circuit comprising capacitance 18 between said grid and said cathode paralleled by a series combination of two inductors 13, 20B, 22, a plate tank circuit comprising capacitance 19 between plate and cathode paralleled by a series combination of two inductors 20A, 22, one 22 of the two inductors included in each tank circuit being common to both and being electrically disposed between said cathode and the junction of the remaining two inductors, said common inductor providing magnetic coupling between said plate and grid tank circuits.

While there has been shown and described what is considered to be the preferred embodiment of the present invention, it will be obvious to those skilled in the art that various modifications and substitutions of equivalents may be made therein without departing from the true scope of the invention as defined by the appended claims.

The present invention is a division of my patent application Serial No. 154,535, filed April 7, 1950, entitled "Tuner for Television Receiver," now United States Patent No. 2,579,789, issued December 25, 1951.

I claim:

1. In a television receiver tuner, an oscillator comprising an electron tube having at least cathode, grid, and plate electrodes, a grid tank circuit comprising capacitance between said grid and said cathode paralleled by a series combination of two inductors, a plate tank circuit comprising capacitance between plate and cathode paralleled by a series combination of two inductors, one of the two inductors included in each tank circuit being common to both and being electrically disposed between said cathode and the junction of the remaining two inductors, said common inductor providing magnetic coupling between said plate and grid tank circuits.

2. In a television receiver tuner, an oscillator comprising an electron tube having at least cathode, grid, and plate electrodes, a grid tank circuit comprising capacitance between said grid and said cathode paralleled by a series combination of two inductors, a plate tank circuit comprising capacitance between plate and cathode paralleled by a series combination of two inductors, one of the two inductors included in each tank circuit being common to both and being electrically disposed between said cathode and the junction of the remaining two inductors, said common inductor providing magnetic coupling between said plate and grid tank circuits, a grid capacitor between said grid tank circuit and grid, a grid resistor between said grid and cathode, the plate tank circuit inductors being arranged in a series anode-voltage supply path, and a coupling capacitor for coupling said common inductor to said cathode.

3. In a television receiver tuner, an oscillator comprising an electron tube having at least cathode, grid, and plate electrodes, a grid tank circuit comprising capacitance between said grid and said cathode paralleled by a series combination of two inductors, a plate tank circuit comprising capacitance between plate and cathode paralleled by a series combination of two inductors, one of the two inductors included in each tank circuit being common to both and being electrically disposed between said cathode and the junction of the remaining two inductors, said common inductor providing magnetic coupling between said plate and grid tank circuits, the plate tank circuit inductors being arranged in a series plate-voltage supply path, and a coupling capacitor for coupling said common inductor to said cathode.

EMMERY J. H. BUSSARD.

No references cited.